(12) United States Patent
Chen et al.

(10) Patent No.: US 11,764,925 B2
(45) Date of Patent: *Sep. 19, 2023

(54) REFERENCE SIGNAL SENDING METHOD AND COMMUNICATIONS DEVICE

(71) Applicant: Huawei Technologies Co., Ltd., Shenzhen (CN)

(72) Inventors: Lei Chen, Shenzhen (CN); Xi Zhang, Ottawa (CA); Rong Wen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

This patent is subject to a terminal disclaimer.

(21) Appl. No.: 17/391,785

(22) Filed: Aug. 2, 2021

(65) Prior Publication Data

US 2022/0060299 A1  Feb. 24, 2022

Related U.S. Application Data

(63) Continuation of application No. 16/503,225, filed on Jul. 3, 2019, now Pat. No. 11,082,179, which is a (Continued)

(30) Foreign Application Priority Data

Jan. 5, 2017 (CN) .......................... 201710008210.9

(51) Int. Cl.
*H04L 5/00* (2006.01)

(52) U.S. Cl.
CPC .......... *H04L 5/0048* (2013.01); *H04L 5/0005* (2013.01)

(58) Field of Classification Search
CPC ..... H04L 5/0005; H04L 5/0048; H04L 5/005; H04L 5/0051; H04L 27/2613; H04L 27/2675

See application file for complete search history.

(56) References Cited

U.S. PATENT DOCUMENTS 10,111,104 B2 * 10/2018 Kim ........................ H04L 5/005
10,230,512 B2 3/2019 Hessler et al.
(Continued)

FOREIGN PATENT DOCUMENTS

CA 3014029 A1 8/2017
CN 104160766 A 11/2014
(Continued)

OTHER PUBLICATIONS

"Discussion on Phase Tracking RS for Multi-Antenna," 3GPP TSG RAN WG1 Meeting #87 Reno, USA, R1-1611811, pp. 1-6, 3rd Generation Partnership Project, Valbonne, France (Nov. 14-18, 2016).

(Continued)

*Primary Examiner* — Eric Nowlin
(74) *Attorney, Agent, or Firm* — Leydig, Voit & Mayer, Ltd.

(57) ABSTRACT

A reference signal sending method and a communications device are provided. The reference signal sending method includes: generating, by a first device, a tracking reference signal, where the tracking reference signal corresponds to a DMRS port that is used by the first device when the first device sends data to a second device; mapping, by the first device, the tracking reference signal to a time-frequency resource that is used by the first device when the first device sends the data to the second device through the DMRS port, where the tracking reference signal is mapped to at least two modulation symbols on a same frequency resource in one transmission slot; and sending, by the first device, the tracking reference signal mapped to the time-frequency resource to the second device.

20 Claims, 6 Drawing Sheets

Related U.S. Application Data continuation of application No. PCT/CN2018/071280, filed on Jan. 4, 2018.

(56) References Cited

U.S. PATENT DOCUMENTS

| | | | |
|---|---|---|---|
| 10,644,858 | B2 | 5/2020 | Hessler et al. |
| 10,659,119 | B2 | 5/2020 | Li et al. |
| 10,778,493 | B2 | 9/2020 | Akkarakaran et al. |
| 10,805,052 | B2* | 10/2020 | Molés .............. H04L 5/0094 |
| 2012/0087427 | A1 | 4/2012 | Noh et al. |
| 2014/0334449 | A1 | 11/2014 | Rubin et al. |
| 2015/0288425 | A1 | 10/2015 | Kim et al. |
| 2015/0341803 | A1* | 11/2015 | Kim .................. H04W 24/02 370/252 |
| 2016/0056977 | A1 | 2/2016 | Wang et al. |
| 2018/0041321 | A1 | 2/2018 | Guo et al. |
| 2018/0167237 | A1 | 6/2018 | Gudovskiy et al. |
| 2018/0331804 | A1 | 11/2018 | Hessler et al. |
| 2019/0199500 | A1 | 6/2019 | Hessler et al. |
| 2019/0215118 | A1* | 7/2019 | Molés .............. H04L 41/0803 |
| 2019/0312697 | A1 | 10/2019 | Li et al. |
| 2019/0326964 | A1 | 10/2019 | Li et al. |
| 2019/0327056 | A1 | 10/2019 | Chen et al. |
| 2019/0349240 | A1 | 11/2019 | Saito et al. |
| 2019/0356463 | A1 | 11/2019 | Zhang et al. |
| 2020/0008228 | A1 | 1/2020 | Lee et al. |
| 2020/0052930 | A1 | 2/2020 | Kim et al. |
| 2020/0067669 | A1* | 2/2020 | Tang .................. H04B 7/0456 |
| 2020/0196332 | A1 | 6/2020 | Yokomakura et al. |
| 2020/0259609 | A1 | 8/2020 | Saito et al. |
| 2020/0366436 | A1* | 11/2020 | Molés .............. H04W 72/0453 |
| 2020/0396047 | A1* | 12/2020 | Gao .................. H04L 5/0051 |
| 2020/0412592 | A1 | 12/2020 | Akkarakaran et al. |
| 2021/0014021 | A1* | 1/2021 | Hunukumbure ...... H04L 5/0051 |
| 2021/0058207 | A1 | 2/2021 | Lee et al. |
| 2021/0076389 | A1 | 3/2021 | Zhang et al. |

FOREIGN PATENT DOCUMENTS

| | | | |
|---|---|---|---|
| CN | 104919734 A | 9/2015 | |
| CN | 105357160 A | 2/2016 | |
| CN | 107888266 A | 4/2018 | |
| CN | 108259143 A | 7/2018 | |
| CN | 108259401 A | 7/2018 | |
| CN | 108282284 A | 7/2018 | |
| CN | 108604974 A | 9/2018 | |
| EP | 3414865 A1 | 12/2018 | |
| EP | 3565161 A1 | 11/2019 | |
| EP | 3565165 A1 | 11/2019 | |
| EP | 3565205 A1 | 11/2019 | |
| EP | 3565205 A4 | 12/2019 | |
| KR | 20180101495 A | 9/2018 | |
| KR | 20190090863 A | 8/2019 | |
| KR | 20190097265 A | 8/2019 | |
| RU | 2713512 C1 | 2/2020 | |
| WO | WO-2014104505 A1 * | 7/2014 | ........... H04L 5/0035 |
| WO | 2016000915 A1 | 1/2016 | |
| WO | 2017138871 A1 | 8/2017 | |
| WO | 2018120875 A1 | 7/2018 | |
| WO | 2018121671 A1 | 7/2018 | |
| WO | 2018127071 A1 | 7/2018 | |

OTHER PUBLICATIONS

"On RS Design for Phase Tracking in NR," 3GPP TSG RAN WG1#87 Reno, USA, R1-1612860, pp. 1-12, 3rd Generation Partnership Project, Valbonne, France (Nov. 14-18, 2016).

"WF on RS for Phase Tracking," 3GPP TSG RAN WG1 Meeting #87, Reno, USA, R1-1613553 , pp. 1-3, 3rd Generation Partnership Project, Valbonne, France (Nov. 14-18, 2016).

LG Electronics, On PT-RS Design, Jan. 18, 2017, 3GPP TSG RAN WG1 Meeting NR#3, Tdoc: R1-1715866 (Year: 2017).

Samsung, Discussion on PT-RS, Jan. 18, 2017, 3GPP TSG RAN WG1 Meeting NR#3, Tdoc: R1-1715968 (Year: 2017).

NTT DOCOMO, Inc., Views on PT-RS, Sep. 18, 2017, 3GPP TSG RAN WG1 Meeting NR Ad-Hoc#3, Tdoc R1-1716089 (Year: 2017).

Intel Corporation, Remaining Details on PT-RS, Sep. 18, 2017, 3GPP TSG RAN WG1 Meeting NR Ad-Hoc#3, Tdoc: R1-1716301 (Year: 2017).

Nokia et al., On remaining details on PT-RS design, Sep. 18, 2017, 3GPP TSG RAN WG1 Meeting N R Ad-Hoc#3, Tdoc: R1-1716510 (Year: 2017).

Catt, Discussion on phase noise compensation RS for NR, Oct. 10, 2016, 3GPP, 3GPP TSG RAN WG1 Meeting #86bis, Tdoc: R1-1608781, http://www.3gpp.org/ftp/TSG_RAN/WG1_RL1/TSGR1_86b/Docs/R1-1608781.zip (retrieved on Jul. 3, 2020) (Year: 2016).

Huawei et al., Reference signal design for phase noise compensation in HF, Oct. 10, 2016, 3GPP, 3GPP TSG RAN WG1 Meeting #86bis, Tdoc: R1-1608822, http://www.3gpp.org/ftp/TSG_RAN/WG 1_RL1/TSGR1 _86b/Docs/R1-1608822 .zip (retrieved on Jul. 3, 2020) (Year: 2016).

Huawei et al., Details of QCL assumptions and related RS design considerations, Dec. 14, 2016, 3GPP, 3GPP TSG RAN WG1 Meeting #87, Tdoc: R1-1611239,, http://www.3gpp.org/ftp/TSG_RAN/WG1_RL1/TSGR1_87/Docs/R1 -1611239.zip (retrieved on Jul. 3, 2020) (Year: 2016).

LG Electronics, Discussion on QCL assumptions for NR, Dec. 14, 2016, 3GPP, 3GPP TSG RAN WG1 Meeting #87, Tdoc: R1-1611806, http://www.3gpp.org/ftp/TSG RAN/WG1_RL1/TSGR1 87/Docs/R1-1611806.zip (retrieved on Jul. 3, 2020) (Year: 2016).

Samsung, QCL relations for different types of RS, Dec. 14, 2016, 3GPP, 3GPP TSG RAN WG1 #87, Tdoc R1-1612492, http://www.3gpp.org/ftp/TSG RAN/WG1 RL1/TSGR1 87/Docs/R1-1612492.zip (retrieved on Jul. 3, 2020) (Year: 2016).

NTT DOCOMO, Inc., Views on RS for phase tracking, Nov. 14, 2016, 3GPP, 3GPP TSG RAN WG1 Meeting #87, Tdoc: R1-1612720, http://www.3gpp.org/ftp/TSG_ RAN/WG1_RL1/TSGR1_87/Docs/R1-1612720.zip (retrieved on Jul. 3, 2020) (Year: 2016).

Nokia et al., On QCL Configurations in N R, Nov. 14, 2016, 3GPP, 3GPP TSG-RAN WG1#87, Tdoc R1-1612859, http://www.3gpp.org/ftp/TSG_RAN/WG1_RL1/TSGR 1_87/Docs/R 1-1612859.zip (retrieved on Jul. 3, 2020) (Year: 2016).

Huawei et al., WF on RS for Phase Tracking, Nov. 14, 2016, 3GPP, 3GPP TSG RAN WG1 Meeting #87, Tdoc R1-1613426, http://www.3gpp.org/ftp/TSG_ RAN/WG1_RL1/TSGR1_87/Docs/R1-1613426.zip (retrieved on Jul. 3, 2020) (Year: 2016).

Xinwei, Discussion and Evaluation of Phase Tracking RS Design, Jan. 16, 2017, 3GPP, 3GPP TSG-RAN WG1 NR Ad Hoc, Tdoc: R 1-1700781, http://www.3gpp.org/ftp/TSG_RAN/WG1_RL1/TSGR1_AH/NR_AH_1701/Docs/R1-1700781.zip (retrieved on Jul. 3, 2020) (Year: 2017).

Qualcomm Incorporated, Phase and frequency tracking reference signal considerations, Jan. 16, 2017, 3GPP, 3GPP TSG-RAN WG1 #87ah-N R, Tdoc: R1-1700808, http://www.3gpp.org/ftp/TSG RAN/WG1_RL1/TSGR_1_Ah/N_R_AH_ 1701/Docs/R1-1700808.zip (retrieved on Jul. 3, 2020) (Year: 2017).

Qualcomm Incorporated, Discussion on tracking RS and RLM, Jan. 16, 2017, 3GPP, 3GPP TSG-RAN WG1 £87ah-NR, Tdoc: R1-1700811, http://www.3gpp.org/ftp/TSG_RAN/WG1_RL1/TSGR1_AH/NR_AH_ 1701/Docs/R1-1700811.zip (retrieved on Jul. 3, 2020) (Year: 2017).

Ericsson, On DL and UL phase noise tracking RS (PTRS), Jan. 16, 2017, 3GPP, 3GPP TSG-RAN WG1 #87ah-NR, Tdoc: R1-1701161, http://www.3gpp.org/ftp/TSG_RAN/WG1_RL1/TSGR1_AH/NR_AH_ 1701/Docs/R1-1701161. zip (retrieved on Jul. 3, 2020)(Year: 2017).

U.S. Appl. No. 16/503,225, filed Jul. 3, 2019.

* cited by examiner

REFERENCE SIGNAL SENDING METHOD AND COMMUNICATIONS DEVICE

CROSS-REFERENCE TO RELATED APPLICATIONS

This application is a continuation of U.S. patent application Ser. No. 16/503,225, filed on Jul. 3, 2019, which is a continuation of International Patent Application No. PCT/CN2018/071280, filed on Jan. 4, 2018, which claims priority to Chinese Patent Application No. 201710008210.9, filed on Jan. 5, 2017. All of the afore-mentioned patent applications are hereby incorporated by reference in their entireties.

TECHNICAL FIELD

The present invention relates to the communications field, and more specifically, to a reference signal sending method and a communications device.

BACKGROUND

In existing wireless communications networks (such as a 2G network, a 3G network, and a 4G network), all operating frequency bands of communications systems fall within a frequency range below 6 GHz, and fewer operating frequency bands are available within this frequency range. Consequently, an ever-increasing communication requirement cannot be met. On the contrary, a large quantity of frequency bands are not fully used within a frequency range above 6 GHz. Therefore, the industry is studying and developing a next-generation (for example, 5G) wireless communications network whose operating frequency band is above 6 GHz, to provide an ultrafast data communications service. Within the frequency range above 6 GHz, frequency bands that can be used in the next-generation wireless communications network include frequency bands located at 28 GHz, 39 GHz, 60 GHz, 73 GHz, and the like. Because the operating frequency band of the next-generation wireless communications network is above 6 GHz, the next-generation wireless communications network has notable features of a high-frequency communications system, such as high bandwidth and a highly-integrated antenna array, and therefore easily implements a relatively high throughput. However, compared with the existing wireless communications networks, the next-generation wireless communications network that operates within the range above 6 GHz is to suffer from severer intermediate radio frequency distortion, especially impact of phase noise. In addition, impact of a Doppler effect and a central frequency offset (central frequency offset, CFO) on performance of the high-frequency communications system is also aggravated as a frequency band locates at a higher location. A common feature of the phase noise, the Doppler effect, and the CFO is that a phase error is introduced to data reception of the high-frequency communications system, and consequently the performance of the high-frequency communications system degrades and even the high-frequency communications system cannot operate.

SUMMARY

In view of this, this application provides a reference signal sending method and a communications device, so that a receiving device that receives a reference signal can estimate a phase error of the signal, and further can compensate the received signal based on the phase error, thereby improving receiving performance of the receiving device.

According to an aspect of an embodiment of the present invention, a reference signal sending method is provided. The method includes:

generating, by a first device, a tracking reference signal, where the tracking reference signal corresponds to a DMRS port that is used by the first device when the first device sends data to a second device, and the tracking reference signal is used to track a phase change experienced by a tracking reference signal when the tracking reference signal is transmitted on a channel corresponding to the DMRS port;

mapping, by the first device, the tracking reference signal to a time-frequency resource that is used by the first device when the first device sends the data to the second device through the DMRS port, where the tracking reference signal is mapped to at least two modulation symbols on a same frequency resource in one transmission slot; and sending, by the first device, the tracking reference signal mapped to the time-frequency resource to the second device.

According to another aspect of an embodiment of the present invention, a communications device is provided. The communications device includes:

a processor, configured to generate a tracking reference signal, where the tracking reference signal corresponds to a DMRS port that is used by the communications device when the communications device sends data, and the tracking reference signal is used to track a phase change experienced by a tacking reference signal when the tracking reference signal is transmitted on a channel corresponding to the DMRS port; and further configured to map the tracking reference signal to a time-frequency resource that is used by the communications device when the communications device sends the data through the DMRS port, where the tracking reference signal is mapped to at least two modulation symbols on a same frequency resource in one transmission slot; and a transceiver, configured to send the tracking reference signal mapped to the time-frequency resource.

In the technical solutions provided in the embodiments of the present invention, the tracking reference signal corresponding to the DMRS port that is used when the data is sent is generated, and the tracking reference signal is mapped to the time-frequency resource that is used when the data is sent through the DMRS port. Therefore, the tracking reference signal and other data transmitted through the DMRS port are transmitted to a peer receiving device through a same channel, so that the peer receiving device can estimate the phase change of the tracking reference signal based on the received tracking reference signal, and further, can consider the estimated phase change as a phase change of the other data transmitted through the DMRS port, and compensate the other data by using the estimated phase change, to eliminate impact of the phase change on receiving performance of the receiving device, thereby improving the receiving performance of the receiving device.

DESCRIPTION OF EMBODIMENTS

The following describes the technical solutions in the embodiments of the present invention with reference to the accompanying drawings in the embodiments of the present invention.

Figure 1:
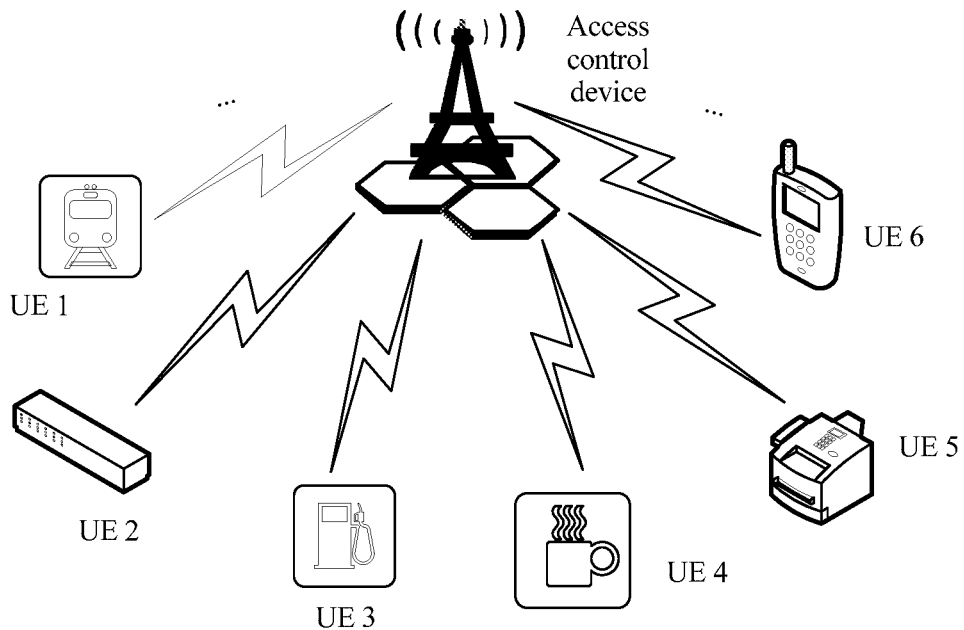
FIG. 1 is an example schematic diagram of a communications system according to an embodiment of the present invention.

The following described technical solutions in the embodiments of the present invention are applied to a communications system. The communications system may include one or more access control devices, and one or more user equipments (User Equipment, UE) that communicate with each access control device. FIG. 1 shows an example of the communications system. The communications system shown in FIG. 1 includes one access control device and a plurality of UEs that communicate with the access control device.

The access control device may be any device that can directly communicate with the UE and that is configured to control the UE to access a communications network, such as a base station, a relay station, or an access point. The base station may be a BTS (Base Transceiver Station, base transceiver station) in a GSM (Global System for Mobile communications, Global System for Mobile Communications) network or a CDMA (Code Division Multiple Access, Code Division Multiple Access) network, an NB (NodeB) in a WCDMA (Wideband Code Division Multiple Access, Wideband Code Division Multiple Access) network, an eNB or an eNodeB (evolved NodeB) in LTE (Long Term Evolution, Long Term Evolution), a base station device in a next-generation (for example, 5G) wireless communications network, or the like.

The UE may be an access terminal, a subscriber unit, a subscriber station, a mobile station, a remote station, a remote terminal, a mobile device, a user terminal, a terminal, a wireless communications device, a user agent, a user apparatus, or the like. The access terminal may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a notebook computer, a tablet computer, a handheld device having a wireless communication function, a computing device, an in-vehicle terminal, a wearable device, a terminal device in a next-generation (for example, 5G) wireless communications network, or the like.

Communication between the access control device and the UE includes uplink signal transmission and downlink signal transmission. A frequency band used for uplink signal transmission may be the same as or different from a frequency band used for downlink signal transmission. As described in the background, when the frequency band used for uplink signal transmission and the frequency band used for downlink signal transmission are high frequency bands (in this application, all frequency bands above 6 GHz are considered as high frequency bands) or uplink signal transmission and downlink signal transmission are performed in another scenario in which severe phase distortion exists (for example, a high-speed railway), a severe phase error is introduced to signal reception due to, for example, phase noise, a Doppler effect, or a CFO, and consequently performance of the communications system degrades. In this case, the technical solutions provided in the embodiments of the present invention may be used to estimate the phase error, so that when a signal is received, the received signal is compensated by using the estimated phase error.

Figure 2:
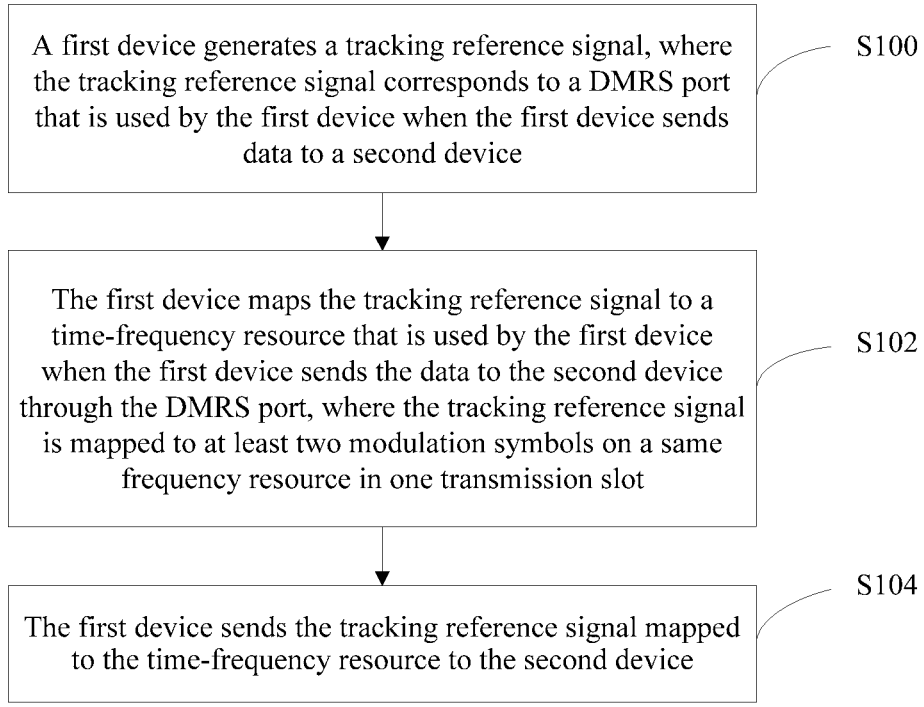
FIG. 2 is an example flowchart of a reference signal sending method according to an embodiment of the present invention.

An embodiment of the present invention provides a reference signal sending method. As shown in FIG. 2, the method includes the following steps.

S100. A first device generates a tracking reference signal, where the tracking reference signal corresponds to a DMRS (Demodulation Reference Signal, demodulation reference signal) port that is used by the first device when the first device sends data to a second device. The tracking reference signal may be used to track a phase change experienced by a tracking reference signal when the tracking reference signal is transmitted on a channel corresponding to the DMRS port. In this embodiment of the present invention, the DMRS port is an antenna port associated with a DMRS that has a specific pattern and/or sequence. The DMRS may also be referred to as a UE specific RS (user specific reference signal), and the DMRS is used to demodulate user data. For example, for convenience, antenna ports 5, 7, 8, 9, 10, 11, 12, 13, 14, and the like in LTE are all referred to as DMRS ports in this embodiment of the present invention. In this embodiment of the present invention, the antenna port is a logical port rather than a physical port of a physical antenna. For a definition of the antenna port, refer to a related definition of "Antenna Port" in an existing LTE standard. One tracking reference signal or at least two tracking reference signals may be generated in this step, and one DMRS port or at least two DMRS ports may be used by the first device when the first device sends the data to the second device. A specific quantity of tracking reference signals and a specific quantity of DMRS ports may be determined based on a configuration of the first device. In this embodiment of the present invention, generating the tracking reference signal corresponding to the DMRS port actually represents configuring a corresponding tracking reference signal port for the DMRS port. A definition of the tracking reference signal port is similar to the definition of the DMRS port. To be specific, the tracking reference signal port is an antenna port associated with a tracking reference signal that has a specific pattern and/or sequence.

When only one DMRS port is configured when the first device sends the data to the second device, the first device generates a tracking reference signal, namely, one tracking reference signal, corresponding to the DMRS port for the DMRS port, in other words, configures one corresponding tracking reference signal port for the DMRS port.

When two or more DMRS ports used to send the data to the second device are configured for the first device, step S100 is generating a corresponding tracking reference signal for each of the DMRS ports. The DMRS ports may correspond to a same tracking reference signal or may correspond to different tracking reference signals, in other words, the DMRS ports may correspond to a same tracking reference signal port or may correspond to different tracking reference signal ports.

When there are two or more DMRS ports corresponding to a same tracking reference signal, step S100 may be generating a tracking reference signal for only one of the ports, and considering the generated tracking reference signal as a tracking reference signal(s) corresponding to the other DMRS port(s). When a plurality of DMRS ports correspond to a same tracking reference signal, few overheads are occupied, thereby improving communication efficiency. In an embodiment, if there are quasi-co-located DMRS ports, these quasi-co-located DMRS ports may correspond to a same tracking reference signal. To be specific, the first device needs to generate a tracking reference signal for only one of the DMRS ports, and then consider the tracking reference signal as a tracking reference signal(s) corresponding to the other DMRS port(s). In this embodiment of the present invention, if there are quasi-co-located DMRS ports, it indicates that data transmitted through these DMRS ports experiences a same phase change. In an embodiment of the present invention, an antenna port (namely, the tracking reference signal port) associated with the tracking reference signal in step S100 and the DMRS port are also quasi-co-located. In this embodiment of the present invention, the tracking reference signal is a type of reference signal, and is a predefined signal known to both communications parties (namely, the first device and the second device).

S102. The first device maps the tracking reference signal to a time-frequency resource that is used by the first device when the first device sends the data to the second device through the DMRS port, where the tracking reference signal is mapped to at least two modulation symbols on a same frequency resource in one transmission slot.

Figure 3A:
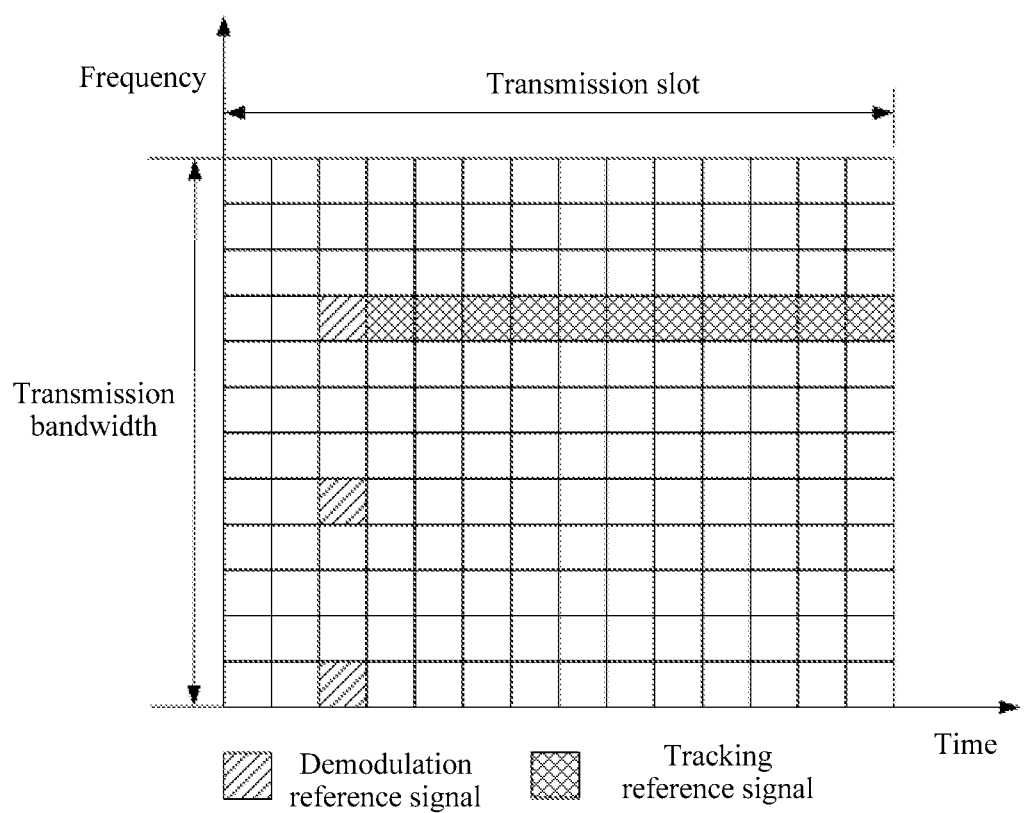
FIG. 3A is an example schematic diagram of a structure of a resource block according to an embodiment of the present invention.

In this embodiment of the present invention, the time-frequency resource is similar to a time-frequency resource in existing LTE, and is a radio resource that includes time and frequency and that is used to transmit a signal. The time-frequency resource that is used by the first device when the first device sends the data to the second device through the DMRS port may include one or more resource blocks (RB, Resource Block). The RB includes a fixed quantity of subcarriers in frequency domain and occupies one transmission slot in time domain. Bandwidth represented by the fixed quantity of subcarriers is referred to as transmission bandwidth of the RB. The resource block includes a fixed quantity of resource elements (RE, Resource Element). Each resource element occupies one subcarrier in frequency domain and occupies duration of one modulation symbol in time domain. FIG. 3A shows an example of the RB, where a vertical axis represents subcarrier frequency and a horizontal axis represents time. The RB includes 12×14 small grids, each small grid represents one RE, and the RB occupies duration of 14 modulation symbols on 12 subcarriers. In this embodiment of the present invention, the modulation symbol may be an OFDM (Orthogonal Frequency Division Multiplexing, orthogonal frequency division multiplexing) symbol, or may be a symbol generated in another modulation scheme.

In this embodiment of the present invention, mapping the tracking reference signal to the time-frequency resource means determining, in the time-frequency resource, a location at which an RE is used to transmit the tracking reference signal, and modulating, within duration corresponding to the RE, the tracking reference signal to a subcarrier corresponding to the RE, to form a modulation symbol.

The same frequency resource may be one subcarrier or may be a plurality of subcarriers. If the same frequency resource is a plurality of subcarriers, the at least two modulation symbols on the same frequency resource mean that there are at least two modulation symbols on each subcarrier.

If at least two tracking reference signals are generated in step S100, in step S102, each tracking reference signal needs to be mapped to at least two modulation symbols on a same frequency resource in one transmission slot. However, the plurality of tracking reference signals may be mapped to a same frequency resource or may be mapped to different frequency resources. If different tracking reference signals are mapped to a same frequency resource, the different tracking reference signals may be mapped to different modulation symbols or may be mapped to a same modulation symbol. When different tracking reference signals are mapped to a same modulation symbol on a same frequency resource, specifically, precoding is first separately performed on these different tracking reference signals, then precoded tracking reference signals are superposed, and finally, a result obtained after the superposing is mapped to the time-frequency resource.

Figure 3B:
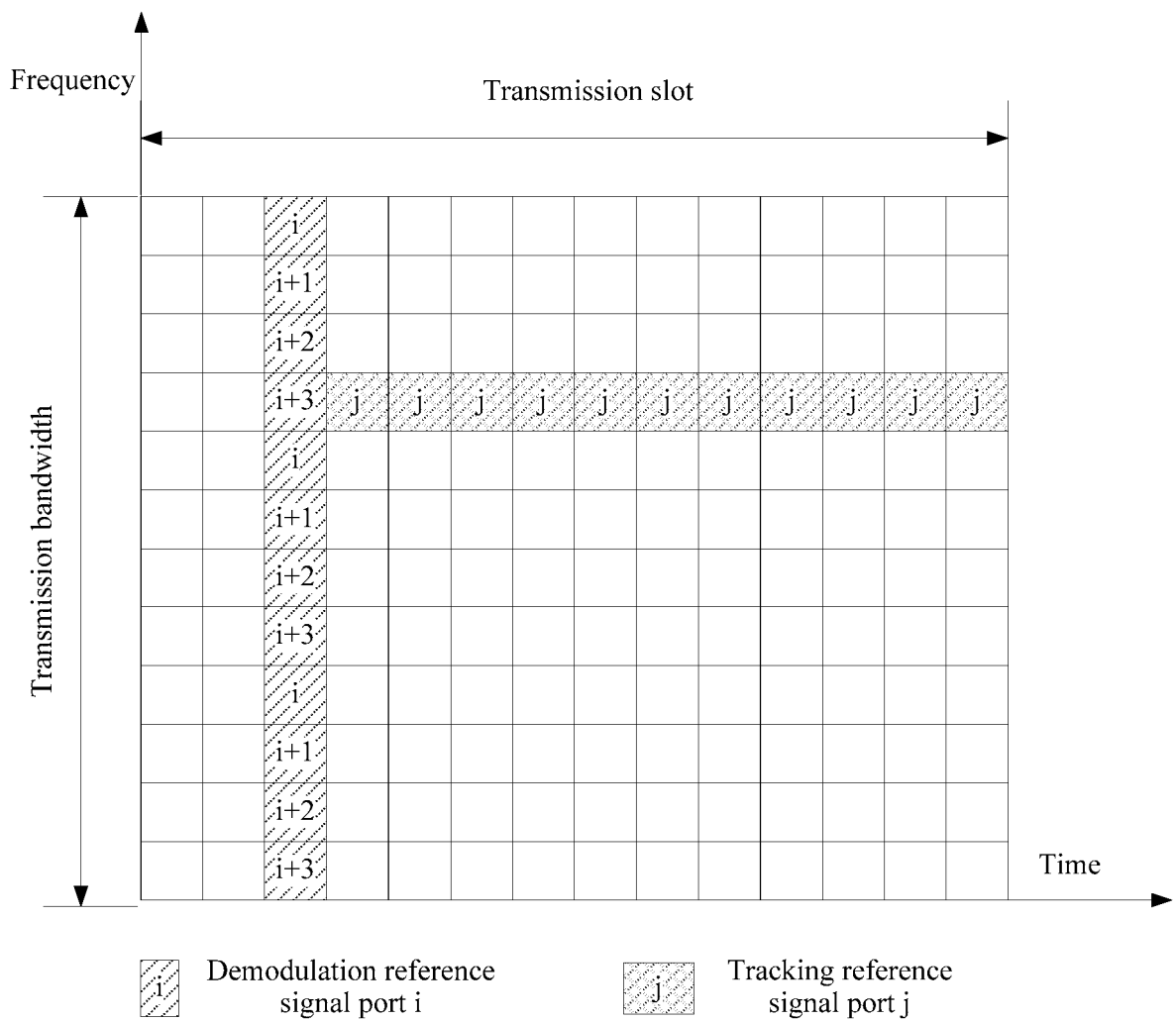
FIG. 3B is a schematic diagram of a location to which a tracking reference signal is mapped in a time-frequency resource according to an embodiment of the present invention.
Figure 3C:
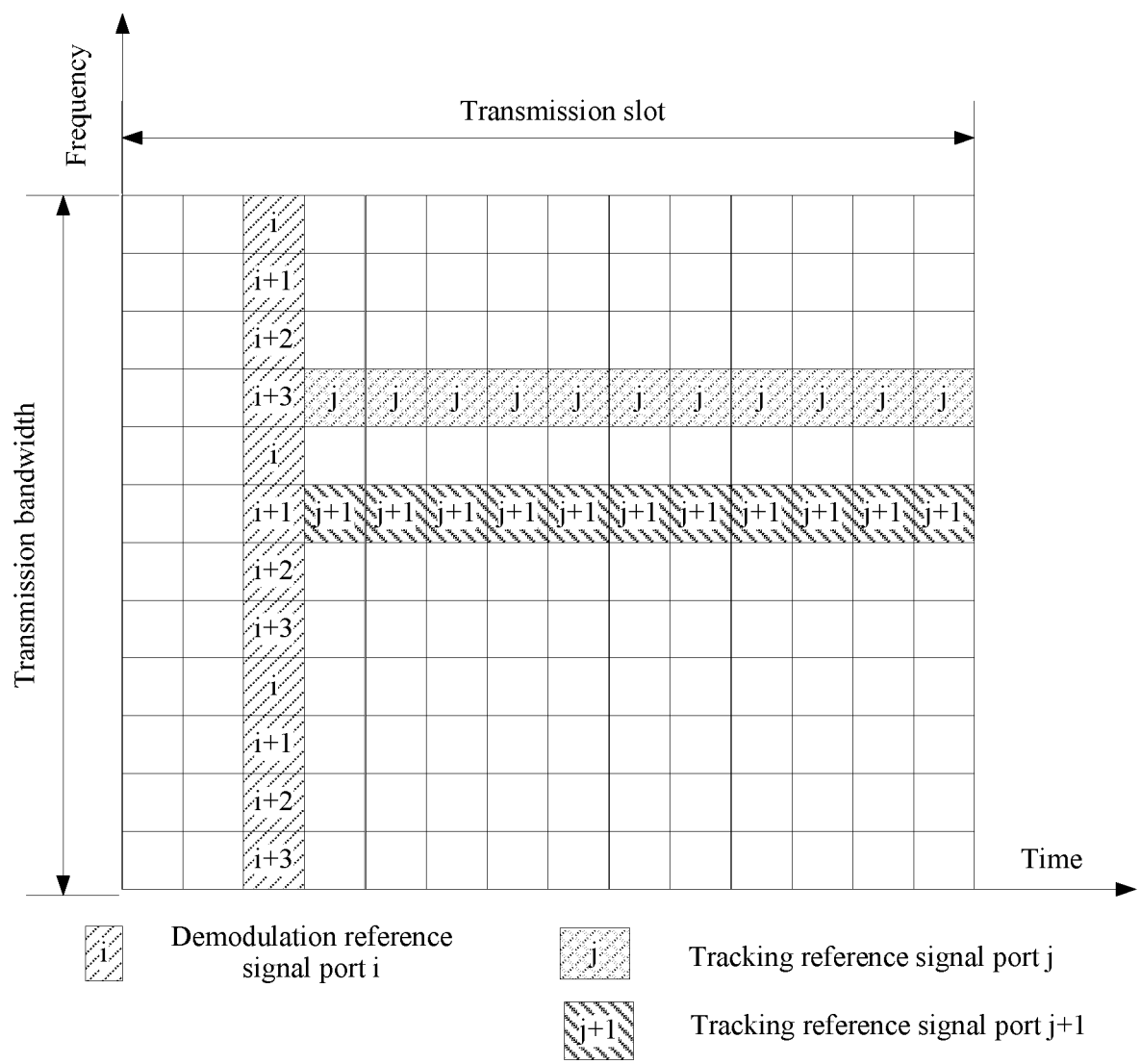
FIG. 3C is a schematic diagram of another location to which a tracking reference signal is mapped in a time-frequency resource according to an embodiment of the present invention.

In an embodiment, when at least two DMRS ports used by the first device to send the data to the second device are allocated, in step S102, tracking reference signals corresponding to at least two of the at least two DMRS ports may be mapped to a same frequency resource, or tracking reference signals corresponding to different DMRS ports may be mapped to different frequency resources. In a specific example, as shown in FIG. 3B, four DMRS ports are used by the first device to send the data to the second device, and numbers of the four DMRS ports are i, i+1, i+2, and i+3, respectively. All tracking reference signals generated for all the DMRS ports are mapped to a same frequency resource, for example, REs identified by a number j that are shown in FIG. 3B. In another specific example, as shown in FIG. 3C, a tracking reference signal generated for a DMRS port numbered i and a tracking reference signal generated for a DMRS port numbered i+1 are mapped to a same frequency resource, for example, REs identified by a number j+1 in FIG. 3C, and a tracking reference signal generated for a DMRS port numbered i+2 and a tracking reference signal generated for a DMRS port numbered i+3 are mapped to another frequency resource, for example, REs identified by a number j in FIG. 3C. It can be learned from FIG. 3B and FIG. 3C that different tracking reference signal ports may share a same time-frequency resource, or may occupy different time-frequency resources.

In a specific example, one DMRS port is used by the first device when the first device sends the data to the second device, the time-frequency resource allocated to the first device for sending the data to the second device through the DMRS port is one RB, and one tracking reference signal is generated for the DMRS port. As shown in FIG. 3A, REs identified by oblique stripes in the RB each are a time-frequency resource allocated to the DMRS port for transmitting a DMRS, REs identified by meshes each are a time-frequency resource used to send the generated tracking reference signal, in other words, each are a time-frequency resource location to which the tracking reference signal is mapped, and the other REs may be used to transmit other data. In FIG. 3A, the tracking reference signal is mapped to consecutive modulation symbols on one subcarrier. It may be understood that the tracking reference signal may be mapped to inconsecutive modulation symbols on one subcarrier.

Step S104: The first device sends the tracking reference signal mapped to the time-frequency resource to the second device.

In this embodiment, the tracking reference signal corresponding to the DMRS port that is used by the first device when the first device sends the data to the second device is generated, and the tracking reference signal is mapped to the time-frequency resource that is used by the first device when the first device sends the data to the second device through the DMRS port. Therefore, the tracking reference signal and other data transmitted through the DMRS port are transmitted to the second device through a same channel, so that the second device can estimate the phase change of the tracking reference signal based on the received tracking reference signal, and further, can consider the estimated phase change as a phase change of the other data transmitted through the DMRS port, and compensate the other data by using the estimated phase change, to eliminate impact of the phase change on receiving performance of the second device, thereby improving the receiving performance of the second device.

In a specific embodiment, estimating the phase change of the tracking reference signal is specifically estimating a measurement of signal distortion caused by the phase change, for example, a CPE (Common Phase Error, common phase error) or ICI (Inter-Carrier Interference, inter-carrier interference). In an actual communications system, impact of the ICI on performance of the communications system is less than impact of the CPE on the performance of the communications system. Therefore, generally, only the CPE is considered for compensation.

An example in which OFDM modulation is used when the first device sends the data to the second device is used below to briefly describe a principle depending on which the second device estimates the CPE based on the received tracking reference signal.

The second device receives an OFDM symbol, and obtains a signal $y_j(n)$ after performing processing such as CP removal and FFT processing on the OFDM symbol. $y_j(n)$ may be described by using the following mathematical model:

$$y_j(n) = \sum_{i=1}^{M} \alpha_{i,j} H_j(n) V_i(n) s_i(n) + Z_j(n) \quad (1)$$
$$= \sum_{i=1}^{M} \alpha_{i,j} H_{i,j}^{eff}(n) s_i(n) + Z_j(n)$$

$y_j(n)$ represents a signal received on an $n^{th}$ subcarrier on a $j^{th}$ receive antenna of the second device, i represents a number of a data stream, and M represents a quantity of data streams. $H_j(n)$ represents a channel coefficient vector of the $j^{th}$ receive antenna of the second device on the $n^{th}$ subcarrier, a dimension of $H_j(n)$ is $1*N_{TX}$, and $N_{TX}$ represents a quantity of transmit antennas of the first device. $V_i(n)$ is a precoding vector of an $i^{th}$ data stream on the $n^{th}$ subcarrier, and $V_i(n)$ is an $N_{TX}*1$ vector. $s_i(n)$ represents a transmit symbol of the $i^{th}$ data stream on the $n^{th}$ subcarrier. $Z_j(n)$ represent interference and noise on the $n^{th}$ subcarrier on the $j^{th}$ receive antenna. $\alpha_{i,j}$ indicates a CPE caused by a phase change on the $i^{th}$ data stream on the $j^{th}$ receive antenna, and $\alpha_{i,j}$ is a complex scalar. $H_{i,j}^{eff}(n)$ is an equivalent channel coefficient, and specifically $H_{i,j}^{eff}(n) = H_j(n) V_i(n)$. $H_{i,j}^{eff}(n)$ represents a product of the channel coefficient vector and the precoding vector, and may be estimated by using a DMRS. It should be noted that there is a one-to-one correspondence between a data stream and a DMRS port.

When the model is used to represent a received OFDM symbol that is generated based on data, the transmit symbol $s_i(n)$ of the first device has different values on different data streams, and the values are unknown to the second device. When the model is used to represent a received OFDM symbol that is generated based on a tracking reference signal, because the tracking reference signal is agreed on by both the first device and the second device in advance and is known to both parties, $s_i(n)$ is known on a side of the second device. Therefore, $H_{i,j}^{eff}(n)$ and $s_i(n)$ in formula (1) are known.

When the first device sends only one data stream to the second device (in other words, M=1), $\alpha_{i,j}$ may be estimated by using formula (1).

When the first device sends a plurality of data streams to the second device (in other words, M>1), there are a plurality of values of $\alpha_{i,j}$, and the first device can generate a plurality of tracking reference signals. After receiving the plurality of tracking reference signals, the second device may combine the plurality of tracking reference signals to estimate all the values of $\alpha_{i,j}$, to be specific:

$$\begin{cases} y_j(n_1) = \sum_{i=1}^{M} \alpha_{i,j} H_j(n_1) V_i(n) s_i(n_1) + Z_j(n_1) \\ y_j(n_2) = \sum_{i=1}^{M} \alpha_{i,j} H_j(n_2) V_i(n_2) s_i(n_1) + Z_j(n_2) \\ \vdots \\ y_j(n_T) = \sum_{i=1}^{M} \alpha_{i,j} H_j(n_T) V_i(n_2) s_i(n_T) + Z_j(n_T) \end{cases} \quad (2)$$

T is a quantity of symbols that are generated based on tracking reference signals in one OFDM symbol, $n_k$ represents a number of a subcarrier on which a $k^{th}$ tracking reference signal is located, and k=1, 2, . . . , T.

To simplify processing of the foregoing system of equations, the first device may set tracking reference signals in all data streams on a same subcarrier to a same one. To be specific, in formula (1), $s_i(n)=p(n)$, $1 \leq i \leq M$, and p(n) represents an RS symbol. In this case, formula (1) may be expressed as:

$$y_j(n) = \sum_{i=1}^{M} \alpha_{i,j} H_j(n) V_i(n) p(n) + Z_j(n) \quad (3)$$
$$= p(n) \sum_{i=1}^{M} \alpha_{i,j} H_j(n) V_i(n) + Z_j(n)$$

Because p(n) is known on the side of the second device, $$\hat{y}_j(n) = \frac{y_j(n)}{p(n)} = \sum_{i=1}^{M} \alpha_{i,j} H_j(n) V_i(n) + \frac{Z_j(n)}{P(n)}. \quad (4)$$

Correspondingly, the system (2) of equations may be processed into the following system of equations:

$$\begin{cases} \hat{y}_j(n_1) = \sum_{i=1}^{M} \alpha_{i,j} H_j(n_1) V_i(n_1) + \dfrac{Z_j(n_1)}{p(n_1)} \\ \hat{y}_j(n_2) = \sum_{i=1}^{M} \alpha_{i,j} H_j(n_2) V_i(n_2) + \dfrac{Z_j(n_2)}{p(n_2)} \\ \vdots \\ \hat{y}_j(n_T) = \sum_{i=1}^{M} \alpha_{i,j} H_j(n_T) V_i(n_T) + \dfrac{Z_j(n_T)}{p(n_T)} \end{cases} \quad (5)$$

$T \geq M.$

In the foregoing system of equations, a value of $\alpha_{i,j}$ may be estimated by using an existing algorithm such as ZF (Zero Forcing, zero forcing) or an MMSE (Minimum Mean Square Error, minimum mean square error).

The second device can compensate, based on the estimated CPE, for a phase error that is generated when the second device receives the data, thereby improving receiving performance of the second device.

The method described in the embodiment shown in FIG. 2 may be applied to the communications system shown in FIG. 1. When the method is applied to downlink signal transmission between an access control device and UE, the first device is the access control device, and the second device is the UE. When the method is applied to uplink signal transmission between the access control device and the UE, the first device is the UE, and the second device is the access control device.

Figure 4:
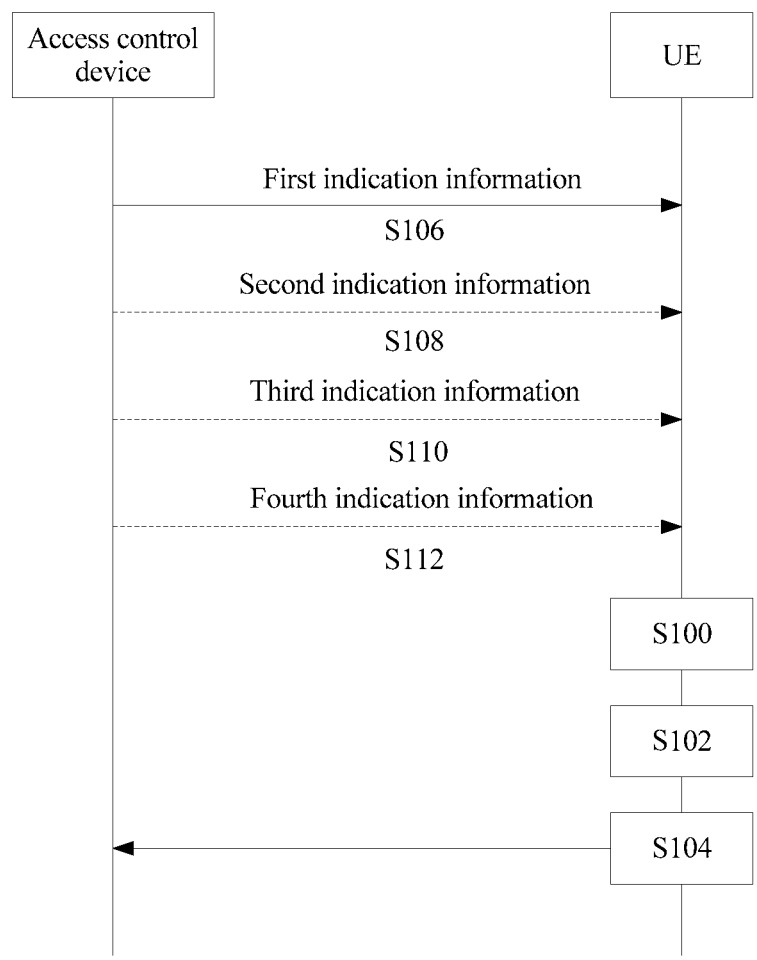
FIG. 4 is a schematic diagram of a reference signal sending method according to an embodiment of the present invention.

An embodiment of the present invention further provides another reference signal sending method. As shown in FIG. 4, the method may be applied to uplink signal transmission in the communications system shown in FIG. 1, and includes the following steps:

Step S106: UE receives first indication information sent by an access control device, where the first indication information is used to instruct the UE to generate a tracking reference signal corresponding to a DMRS port that is used by the UE when the UE sends data to the access control device.

A lower-order modulation scheme (for example, a modulation scheme whose modulation order is lower than or equal to 16) or a higher-order modulation scheme (for example, a modulation scheme whose modulation order is higher than 16) may be used by the UE when the UE sends the data to the access control device through the DMRS port. When the UE performs uplink transmission in the lower-order modulation scheme, when receiving the data sent by the UE, the access control device is insensitive to a phase error caused by phase noise. In this case, the UE may not need to send the tracking reference signal, and the access control device may still correctly receive the data sent by the UE. When the UE performs uplink transmission in the higher-order modulation scheme, when receiving the data sent by the UE, the access control device is very sensitive to a phase error caused by phase noise. In this case, the UE needs to send the tracking reference signal, so that the access control device estimates the phase error on the data based on the tracking reference signal, and compensates the received data based on the phase error, thereby improving receiving performance of the access control device. In view of this, the access control device may determine, based on an actual requirement, whether the access control device needs to send the first indication information to the UE. When a modulation scheme that is used by the UE to send the data to the access control device through the DMRS port is specified by the access control device, the access control device needs to send the first indication information to the UE. It may be understood that, in some embodiments, the first indication information may not be sent, for example, when the UE can self-determine a modulation scheme that is used by the UE during uplink signal transmission, when the UE and the access control device jointly comply with a specific protocol and the protocol specifies that the first indication information does not need to be sent, or when only the higher-order modulation scheme is used by the first device when the first device sends the data to the second device.

The first indication information may be implemented in a plurality of manners, and the plurality of manners may be classified into two types: an explicit indication manner and an implicit indication manner.

In the explicit indication manner, a dedicated message that is used by the access control device to instruct the UE to generate the tracking reference signal corresponding to the DMRS port may be set; or a flag bit may be set in an idle field in a control message sent by the access control device to the UE, to notify, by using the flag bit, the UE whether the UE needs to generate the tracking reference signal. The control message may be an existing physical layer control message such as DCI (Downlink Control Information, downlink control information), or may be an existing non-physical layer control message such as MAC CE (Media Access Control CE, MAC control element) signaling or RRC (Radio Resource Control, Radio Resource Control) signaling.

In the implicit indication manner, an indication function of the first indication information may be implemented by using MCS (Modulation and Coding Scheme, modulation and coding scheme) information that is sent by the access control device to the UE and that is used to notify the UE of a modulation scheme that should be used by the UE when the UE sends data. For example, when an order of the modulation scheme indicated by the MCS information is higher than 2 (for example, a modulation scheme corresponding to a modulation order 2 is QPSK modulation) or is higher than 4 (for example, a modulation scheme corresponding to a modulation order 4 is 16QAM), it is considered that the UE needs to send the tracking reference signal; or when an order of the modulation scheme indicated by the MCS information is lower than or equal to 2 or is lower than or equal to 4, the UE does not need to send the tracking reference signal. The manner in which the MCS information is used to indicate whether the tracking reference signal needs to be sent achieves reuse of the MCS information, so that overheads can be reduced, thereby improving communication or when an order of the modulation scheme indicated by the MCS information is lower than or equal to 2 or is lower than or equal to 4 efficiency. It may be understood that the implicit indication manner is not limited to the listed one, and there may be other manners. The other manners are not enumerated herein.

When receiving the first indication information for instructing the UE to send the tracking reference signal, the UE performs the method provided in the embodiment shown in FIG. 2. Details are not described herein again.

In an embodiment, as shown in FIG. 4, the method may further include:

Step S108: Before step S100, the UE receives second indication information sent by the access control device, where the second indication information is used to indicate a quantity of tracking reference signals that need to be generated by the UE for the DMRS port. Correspondingly, after receiving the second indication information, in step S100, the UE generates tracking reference signals of the quantity indicated by the second indication information.

In a specific implementation, the second indication information may be implemented in an explicit indication manner, or the second indication information may be implemented in an implicit indication manner. In an implementation of the explicit indication manner, the second indication information clearly indicates the quantity of tracking reference signals that need to be generated by the UE. In an implementation of the implicit indication manner, the second indication information does not clearly indicate the quantity of tracking reference signals that need to be generated by the UE, and the UE can know the quantity of tracking reference signals that need to be generated, only by processing the second indication information after receiving the second indication information.

In an implementation of the implicit indication manner, the second indication information specifically includes resource scheduling information that is used to indicate a quantity of time-frequency resources that are used by the UE when the UE sends the data to the access control device through the DMRS port, and the quantity of tracking reference signals that need to be generated by the UE is determined based on the quantity of time-frequency resources that is indicated by the resource scheduling information. In this embodiment of the present invention, the quantity of time-frequency resources may be represented by a quantity of resource blocks. For example, different ranges of a quantity of time-frequency resources that are used when uplink signal transmission is performed through a DMRS port respectively correspond to different quantities of tracking reference signals, and the UE may prestore the correspondence, or the UE obtains the correspondence from the access control device in advance.

In an embodiment, when the time-frequency resource indicated by the resource scheduling information is n resource blocks, and $N_1 \leq n \leq N_2$, the UE needs to generate M tracking reference signals. $N_1$ and $N_2$ have different values, and correspondingly, M also has different values. Table 1 shows an example of the correspondence. It may be understood that, in another embodiment, $N_1$, $N_2$, and M may alternatively have other values. This is not limited in the present invention. In this embodiment of the present invention, the following table shows an example of a correspondence between a quantity of time-frequency resources that are used when uplink signal transmission is performed by using a DMRS port and a quantity of tracking reference signals corresponding to the DMRS port.

TABLE 1

| Quantity n of resource blocks | Quantity M of tracking reference signals |
|---|---|
| 1 ≤ n ≤ 4 | 1 |
| 5 ≤ n ≤ 8 | 2 |
| 9 ≤ n ≤ 12 | 3 |
| 13 ≤ n ≤ 100 | 4 |

The UE may prestore or obtain, in advance, the correspondence in Table 1 or a correspondence similar to the correspondence in Table 1 from the access control device.

After receiving the resource scheduling information, the UE may compare/query Table 1 with/based on a value of the quantity n of resource blocks in the resource scheduling information, to obtain the quantity of tracking reference signals that need to be generated.

In another embodiment, the following manner may alternatively be used by the UE when the UE determines the quantity of tracking reference signals based on the quantity of time-frequency resources that are indicated by the resource scheduling information:

$$M = \lfloor n \cdot \alpha \rfloor \text{ or } \lceil n \cdot \alpha \rceil \tag{7}$$

$\lfloor \ \rfloor$ represents rounding down, $\lceil \ \rceil$ represents rounding up, and $\alpha$ is a value from 0 to 1 (including 0 and 1). A value of $\alpha$ may be prestored in the UE, or may be sent by the access control device to the UE in advance. In a specific example, the value of $\alpha$ may be set to ¼.

It may be understood that, in an implementation of the explicit indication manner of the second indication information, the access control device may also calculate the quantity of tracking reference signals that need to be generated based on Table 1 or formula (7), and then notify the UE of the calculated result by using the second indication information.

In most cases, all time-frequency resources used by the UE during uplink signal transmission need to be allocated by the access control device. Therefore, in these cases, the access control device inevitably needs to notify the UE of an allocated result by using the resource scheduling information. In this embodiment, the quantity of tracking reference signals that need to be generated by the UE is indicated by reusing the resource scheduling information, so that overheads are reduced, thereby improving communication efficiency. In addition, the quantity of tracking reference signals is related to the quantity of time-frequency resources. The solution provided in this embodiment can ensure that the access control device accurately estimates the phase error, without occupying excessive overheads.

As shown in FIG. 4, the method may further include: Step S110: The UE receives third indication information sent by the access control device, where the third indication information is used to indicate a location to which the tracking reference signal corresponding to the DMRS port should be mapped in a time-frequency resource. Correspondingly, after receiving the third indication information, in step S102, the UE maps the tracking reference signal to the location that is in the time-frequency resource and that is indicated by the third indication information. It should be understood that, if there are a plurality of tracking reference signals, locations that are in the time-frequency resource and to which all the tracking reference signals should be mapped may be indicated by using one piece of third indication information, or one piece of third indication information may be sent for each tracking reference signal.

The access control device determines, based on the quantity of time-frequency resources (the quantity n of resource blocks) allocated to the UE for uplink signal transmission and the quantity M of tracking reference signals that need to be generated, a location to which each tracking reference signal should be mapped in the time-frequency resource. The access control device consecutively numbers the n resource blocks 0, 1, 2, . . . , and N in ascending order of subcarrier frequency, where N=n−1. The access control device may determine, based on formula (8), a number of a resource block to which each tracking reference signal should be mapped:

$$N_k = \left\lfloor \frac{N+1}{M} \right\rfloor \cdot k + \Delta \text{ or } N_k = \left\lceil \frac{N+1}{M} \right\rceil \cdot k + \Delta \text{ where} \tag{8}$$

$$0 \leq k \leq M - 1$$

k is a number of a tracking reference signal, and $N_k$ is a number of a resource block to which the tracking reference signal numbered k should be mapped. $\Delta$ represents an offset. $\Delta$ may be 0, may be another preset value, or may be a specific value related to the UE (for example, a value calculated by using a UE-ID, or a value notified by the access control device to the UE).

When a value of $\Delta$ makes a value of $N_k$ calculated by using formula (8) exceed the maximum resource block number N, the number of the resource block to which each tracking reference signal should be mapped may be determined based on formula (9):

$$N_k = \mathrm{mod}\left(\left\lceil \frac{N+1}{M} \right\rceil \cdot k + \Delta, N\right) \text{ or } N_k = \mathrm{mod}\left(\left\lfloor \frac{N+1}{M} \right\rfloor \cdot k + \Delta, N\right) \quad (9)$$

mod(x, y) represents a modulo operation, and mod(x, y) returns a remainder obtained after x is divided by y. It should be noted that formula (9) is applicable to the present invention regardless of a value of $\Delta$.

When the resource block to which each tracking reference signal is mapped is determined, the determining manner shown in formula (8) or (9) can implement pseudo-randomization of the location to which the tracking reference signal is mapped, thereby reducing interference between users.

The access control device may notify the UE of the calculated result by using the third indication information, and in step S102, the UE maps the tracking reference signal to the time-frequency resource based on the calculated result. Further, a specific subcarrier to which each tracking reference signal is mapped in the resource block corresponding to each tracking reference signal may be specified by the access control device, or may be specified in a protocol with which the access control device and the UE jointly comply. In another embodiment, the access control device may notify the UE of the result calculated by using formula (8) or (9). Provided that the UE obtains parameters such as N and M that are needed when the mapping location is calculated by using formula (8) or (9), the UE can calculate the resource block to which each tracking reference signal is mapped. In this case, the third indication information needs to carry only the parameters N and M, and even the second indication information that includes the resource scheduling information is directly used as the third indication information.

As shown in FIG. 4, the method may further include: Step S112: The UE receives fourth indication information sent by the access control device, where the fourth indication information is used to indicate the tracking reference signal corresponding to the DMRS port. Correspondingly, in step S100, the UE generates the tracking reference signal indicated by the fourth indication information.

It may be understood that there is no sequence among steps S106, S108, S110, and S112. In another embodiment, the four steps are not all needed. For example, when the access control device sends any one piece of the second indication information, the third indication information, and the fourth indication information, it is considered by default that the UE needs to generate the tracking reference signal and send the tracking reference signal to the access control device. In this case, the access control device does not need to send the first indication information.

In another embodiment, for a specific DMRS port, the UE can entirely independently determine whether a tracking reference signal needs to be generated, a quantity of tracking reference signals that need to be generated, a type of tracking reference signal that needs to be generated, and a specific location to which each tracking reference signal should be mapped in a time-frequency resource. In this embodiment, none of steps S106, S108, S110, and S110 may be needed. In this embodiment, for a process in which the UE independently determines the foregoing four pieces of information, refer to the foregoing described process in which the access control device determines the foregoing pieces of information. Details are not described herein again. The UE may send the four pieces of information independently determined by the UE to the access control device.

It should be noted that the first indication information, the second indication information, the third indication information, and the fourth indication information may be separately sent, or may be included in a same message.

Figure 5:
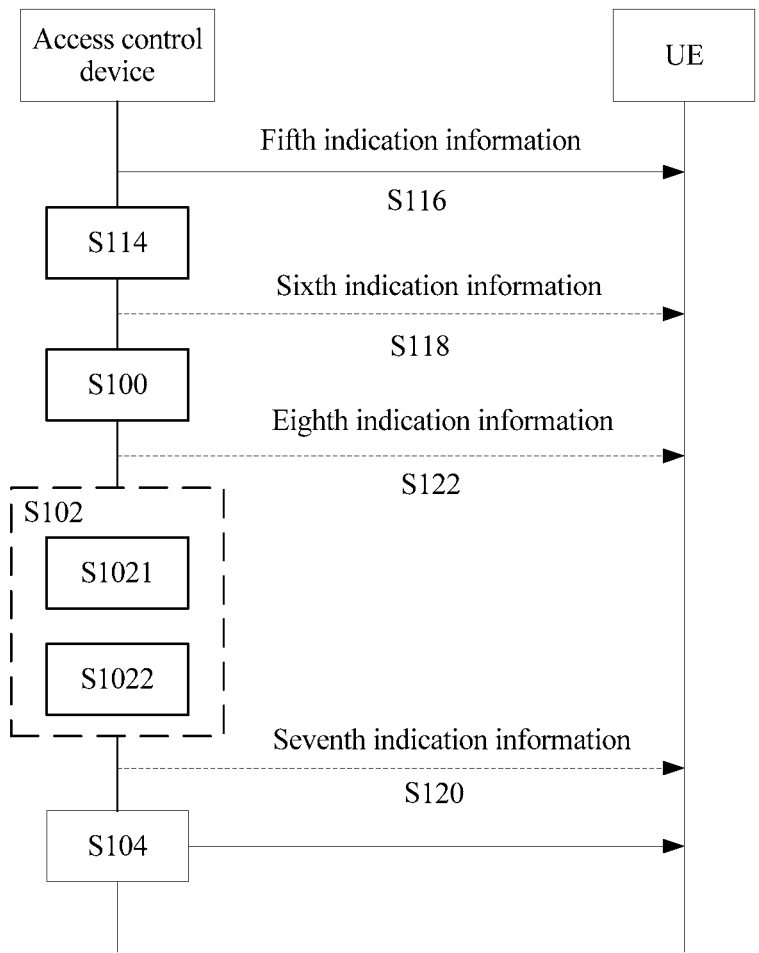
FIG. 5 is another schematic diagram of a reference signal sending method according to an embodiment of the present invention.

An embodiment of the present invention further provides another reference signal sending method. The method may be applied to downlink signal transmission in the communications system shown in FIG. 1. As shown in FIG. 5, in addition to the steps in the embodiment shown in FIG. 2, the method may further include at least one of steps S114, S116, S118, S120, and S122.

Step S114: An access control device determines, based on a time-frequency resource that is used by the access control device when the access control device sends data to the UE through a DMRS port, a quantity of tracking reference signals corresponding to the DMRS port that need to be generated.

When sending the data to the UE through the DMRS port, the access control device allocates the time-frequency resource to the DMRS port. In this step, the access control device may determine, based on the time-frequency resource, the quantity of tracking reference signals that need to be generated for the DMRS port. For a specific process in which the access control device determines the quantity of tracking reference signals based on the time-frequency resource, refer to the process of determining the quantity of tracking reference signals in the embodiment shown in FIG. 4. Details are not described herein again. In this embodiment, the quantity of tracking reference signals that need to be generated is determined based on a quantity of time-frequency resources. In another embodiment, the quantity of tracking reference signals that need to be generated may alternatively be determined based on another communication parameter, for example, a type of the UE, or an MCS that is used by the access control device when the access control device sends the data to the UE through the DMRS port.

Correspondingly, in step S100, the access control device generates tracking reference signals of the quantity determined in step S114.

When it is determined in step S114 that at least two tracking reference signals need to be generated, step S102 may include:

Step S1021: The access control device determines a location to which each tracking reference signal is mapped in the time-frequency resource.

Step S1022: The access control device maps each tracking reference signal to the time-frequency resource based on the determined location.

In the embodiment shown in FIG. 5, step S1021 is performed after step S100. It may be understood that in another embodiment, step S1201 may alternatively be performed before step S100.

Step S116: The access control device sends fifth indication information to the UE, where the fifth indication information is used to indicate that the tracking reference signal is sent on the time-frequency resource that is used by the access control device when the access control device sends the data to the UE through the DMRS port.

As described in the embodiment shown in FIG. 4, the access control device does not need to send the tracking reference signal to the UE in all cases. Generally, the access control device needs to send the tracking reference signal to the UE only when the access control device sends the data to the UE in a higher-order modulation scheme. Certainly, when the access control device sends the data to the UE in a lower-order modulation scheme, the access control device may also send the tracking reference signal to the UE. However, receiving performance of the UE is not improved significantly, and relatively high overheads are occupied. This reduces communication efficiency.

When only the higher-order modulation scheme is used for downlink signal transmission in the communications system shown in FIG. 1, it is considered by default that the UE knows that the access control device certainly sends the tracking reference signal. In this case, the access control device does not need to send the fifth indication information, in other words, does not need to perform step S116.

When the higher-order modulation scheme or the lower-order modulation scheme may be used for downlink signal transmission in the communications system shown in FIG. 1, the access control device needs to notify the UE whether the access control device sends the tracking reference signal to the UE, so that the UE determines whether the UE needs to receive the tracking reference signal. In this case, when the access control device performs downlink signal transmission in the higher-order modulation scheme, the access control device may send the fifth indication information to the UE. When the access control device performs downlink signal transmission in the lower-order modulation scheme, the access control device may not send the fifth indication information, or may send indication information that is used to indicate that the tracking reference signal is not sent. If the UE receives no fifth indication information or receives the indication information that is used to indicate that the tracking reference signal is not sent, the UE does not need to receive the tracking reference signal.

For a specific implementation of the fifth indication information, refer to the implementation of the first indication information. Details are not described herein again.

Step S118: The access control device sends sixth indication information to the UE, where the sixth indication information is used to indicate the quantity of tracking reference signals corresponding to the DMRS port. For a specific implementation of the sixth indication information, refer to the implementation of the second indication information in the embodiment shown in FIG. 4. Details are not described herein again.

Step S120: The access control device sends seventh indication information to the UE, where the seventh indication information is used to indicate a location to which the tracking reference signal is mapped in the time-frequency resource. For a specific implementation of the seventh indication information, refer to the implementation of the third indication information in the embodiment shown in FIG. 4. Details are not described herein again.

Step S122: The access control device sends eighth indication information to the UE, where the eighth indication information is used to indicate the tracking reference signal corresponding to the DMRS port. Generally, a plurality of tracking reference signals can be used by the access control device and the UE. A tracking reference signal or tracking reference signals that is or are selected by the access control device is or are notified to the UE, so that the UE can directly receive the tracking reference signal based on the tracking reference signal indicated by the eighth indication information, to avoid blind detection on the tracking reference signal, thereby improving processing efficiency of the UE during signal reception.

When the access control device sends any one piece of the sixth indication information, the seventh indication information, and the eighth indication information, the access control device may alternatively not send the fifth indication information, because the sixth indication information, the seventh indication information, and the eighth indication information all imply that the access control device sends the tracking reference signal.

In addition to the order shown in FIG. 5, step S118, step S120, and step S122 may alternatively be performed in another different order, provided that step S118, step S120, and step S122 are performed before step S104.

Figure 6:
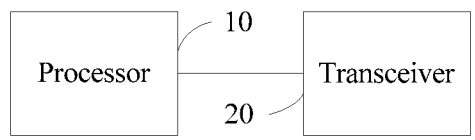
FIG. 6 is an example schematic diagram of a hardware structure of a communications device according to an embodiment of the present invention.

An embodiment of the present invention further provides a communications device. As shown in FIG. 6, the communications device includes a processor 10 and a transceiver 20.

The processor 10 is configured to generate a tracking reference signal, where the tracking reference signal corresponds to a DMRS port that is used by the communications device when the communications device sends data, and the tracking reference signal is used to track a phase change experienced by a tracking reference signal when the tracking reference signal is transmitted on a channel corresponding to the DMRS port; and is further configured to map the tracking reference signal to a time-frequency resource that is used by the communications device when the communications device sends the data through the DMRS port, where the tracking reference signal is mapped to at least two modulation symbols on a same frequency resource in one transmission slot.

The transceiver 20 is configured to send the tracking reference signal mapped to the time-frequency resource.

It may be learned from the foregoing embodiments that the communications device shown in FIG. 6 performs the method provided in the embodiment shown in FIG. 2. Specifically, the processor 10 performs step S100 and step S102 in the embodiment shown in FIG. 2, and the transceiver 20 performs step S104 in the embodiment shown in FIG. 2. Therefore, for more details about performing the foregoing steps by the processor 10 and the transceiver 20, refer to the related descriptions in the embodiment shown in FIG. 2. Details are not described herein again.

The communications device generates the tracking reference signal corresponding to the DMRS port that is used by the communications device when the communications device sends the data, and maps the tracking reference signal to the time-frequency resource that is used when the data is sent through the DMRS port, where the tracking reference signal is mapped to at least two modulation symbols on a same frequency resource in one transmission slot. Therefore, the tracking reference signal and other data transmitted through the DMRS port are transmitted to a peer device through a same channel, so that the peer device can estimate the phase change of the tracking reference signal based on the received tracking reference signal, and further, can consider the estimated phase change as a phase change of the other data transmitted through the DMRS port, and compensate the other data symbols by using the estimated phase change, to eliminate impact of the phase change on receiving performance of the peer device, thereby improving the receiving performance of the peer device.

The communications device shown in FIG. 6 may be further applied to the communications system shown in FIG. 1. When the communications device is applied to downlink signal transmission between an access control device and UE, the communications device is the access control device, and the peer device is the UE. When the communications device is applied to uplink signal transmission between the access control device and the UE, the communications device is the UE, and the peer device is the access control device.

An embodiment of the present invention provides UE. The UE includes the processor 10 and the transceiver 20 that are shown in FIG. 6. When performing uplink signal transmission with an access control device, the UE may generate a tracking reference signal and send the tracking reference signal to the access control device. Specifically, the UE may be configured to perform the reference signal sending method provided in the embodiment shown in FIG. 4.

During uplink signal transmission, in addition to step S104 in the embodiment shown in FIG. 2, the transceiver 20 of the UE may be further configured to perform step S106, step S108, step S110, and step S112 in the embodiment shown in FIG. 4, in other words, configured to receive first indication information, second indication information, a third indication information, and a fourth indication formation. It should be noted that, in another embodiment, the transceiver 20 of the UE may perform some of step S106, step S108, step S110, and step S112, and even perform none of step S106, step S108, step S110, and step S112.

After receiving any one of the foregoing four pieces of indication information, the transceiver 20 of the UE provides the indication information to the processor 10, and the processor 10 performs corresponding processing based on the indication information. For the processing performed by the processor 10 of the UE based on the received indication information, refer to the related descriptions in the embodiment shown in FIG. 4. Details are not described herein again.

An embodiment of the present invention further provides an access control device. The access control device includes the processor 10 and the transceiver 20 that are shown in FIG. 6. When performing downlink signal transmission with UE, the access control device may generate a tracking reference signal and send the tracking reference signal to the UE. Specifically, the access control device may be configured to perform the reference signal sending method provided in the embodiment shown in FIG. 5.

During downlink signal transmission, in addition to step S104 in the embodiment shown in FIG. 2, the transceiver 20 of the access control device may be further configured to perform step S116, step S118, step S120, and step S122 in the embodiment shown in FIG. 5, in other words, configured to send fifth indication information, sixth indication information, a seventh indication information, and an eighth indication information. It should be noted that, in another embodiment, the transceiver 20 of the access control device may perform only some of step S116, step S118, step S120, and step S122, and even perform none of step S116, step S118, step S120, and step S122. It may be understood that the foregoing four pieces of indication information are generated by the processor 10 of the access control device, and then sent by the transceiver of the access control device.

The processor 10 of the access control device may be further configured to perform step S114 in the embodiment in FIG. 5, to be specific, determine, based on a time-frequency resource that is used by the access control device when the access control device sends data by using a DMRS port, a quantity of tracking reference signals corresponding to the DMRS port that need to be generated.

When the processor 10 of the access control device determines that at least two tracking reference signals need to be generated, when performing step S102, the processor 10 of the access control device first determines a location to which each tracking reference signal is mapped in the time-frequency resource, and then maps each tracking reference signal to the time-frequency resource based on the determined location.

For a specific process in which the processor 10 and the transceiver 20 of the access control device perform the foregoing steps, refer to the related descriptions in the embodiments shown in FIG. 2 and FIG. 5. Details are not described herein again.

In the embodiments of the present invention, the processor 10 may be a general purpose processor, for example, but is not limited to, a central processing unit (Central Processing Unit, CPU), or may be a dedicated processor, for example, but is not limited to, a digital signal processor (Digital Signal Processor, DSP), an application-specific integrated circuit (Application-Specific Integrated Circuit, ASIC), and a field programmable gate array (Field Programmable Gate Array, FPGA). In addition, the processor 10 may alternatively be a combination of a plurality of processors.

Further embodiments of the present invention are provided in the following. It should be noted that the numbering used in the following section does not necessarily need to comply with the numbering used in the previous sections.

1. A reference signal sending method, wherein the method comprises:

generating, by a first device, a tracking reference signal, wherein the tracking reference signal corresponds to a demodulation reference signal DMRS port that is used by the first device when the first device sends data to a second device, and the tracking reference signal is used to track a phase change experienced by a tracking reference signal when the tacking reference signal is transmitted on a channel corresponding to the DMRS port;

mapping, by the first device, the tracking reference signal to a time-frequency resource that is used by the first device when the first device sends the data to the second device through the DMRS port, wherein the tracking reference signal is mapped to at least two modulation symbols on a same frequency resource in one transmission slot; and sending, by the first device, the tracking reference signal mapped to the time-frequency resource to the second device.

2. The method according to embodiment 1, wherein there are at least two tracking reference signals; and correspondingly, at least two of the at least two tracking reference signals are mapped to different frequency resources in the time-frequency resource.

3. The method according to embodiment 1, wherein there are at least two tracking reference signals; and correspondingly, at least two of the at least two tracking reference signals are mapped to a same frequency resource in the time-frequency resource.

4. The method according to any one of embodiments 1 to 3, wherein when at least two DMRS ports are used by the first device when the first device sends the data to the second device, each of the at least two DMRS ports corresponds to one tracking reference signal.

5. The method according to embodiment 4, wherein at least two of the at least two DMRS ports correspond to a same tracking reference signal.

6. The method according to embodiment 5, wherein the at least two DMRS ports corresponding to the same tracking reference signal are quasi-co-located.

7. The method according to any one of embodiments 1 to 6, wherein an antenna port associated with the tracking reference signal and the DMRS port are quasi-co-located.

8. The method according to any one of embodiments 1 to 7, wherein a quantity of tracking reference signals is related to a quantity of time-frequency resources.

9. The method according to any one of embodiments 1 to 8, wherein the method further comprises:
receiving, by the first device, first indication information sent by the second device, wherein the first indication information is used to instruct the first device to send the tracking reference signal; and
correspondingly, the generating, by a first device, a tracking reference signal specifically comprises:
generating, by the first device, the tracking reference signal according to the first indication information.

10. The method according to any one of embodiments 1 to 9, wherein the method further comprises:
before the first device generates the tracking reference signal, receiving, by the first device, second indication information sent by the second device, wherein the second indication information is used to indicate a quantity of tracking reference signals that need to be generated.

11. The method according to embodiment 10, wherein the second indication information comprises resource scheduling information used to indicate the time-frequency resource, and the quantity of tracking reference signals that need to be generated by the first device is specifically determined based on the quantity of time-frequency resources indicated by the resource scheduling information.

12. The method according to any one of embodiments 1 to 11, wherein the method further comprises:
before the first device generates the tracking reference signal, receiving, by the first device, third indication information sent by the second device, wherein the third indication information is used to indicate a location to which the tracking reference signal is mapped in the time-frequency resource; and
correspondingly, the mapping, by the first device, the tracking reference signal to a time-frequency resource that is used by the first device when the first device sends the data to the second device through the DMRS port specifically comprises:
mapping, by the first device, the tracking reference signal to the location that is in the time-frequency resource and that is indicated by the third indication information.

13. The method according to any one of embodiments 1 to 12, wherein the method further comprises:
before the first device generates the tracking reference signal, receiving, by the first device, fourth indication information sent by the second device, wherein the fourth indication information is used to indicate the tracking reference signal corresponding to the DMRS port; and
correspondingly, the generating, by a first device, a tracking reference signal specifically comprises:
generating, by the first device, the tracking reference signal indicated by the fourth indication information.

14. The method according to any one of embodiments 1 to 8, wherein the method further comprises:
before the first device generates the tracking reference signal, determining, by the first device based on the quantity of time-frequency resources, a quantity of tracking reference signals that need to be generated; and correspondingly, the generating, by a first device, a tracking reference signal comprises: generating, by the first device, the determined quantity of tracking reference signals.

15. The method according to any one of embodiments 1 to 8 or embodiment 14, wherein the mapping, by the first device, the tracking reference signal to a time-frequency resource that is used by the first device when the first device sends the data to the second device through the DMRS port specifically comprises:
when at least two tracking reference signals are generated, determining, by the first device, a location to which each tracking reference signal is mapped in the time-frequency resource; and
mapping each tracking reference signal to the time-frequency resource based on the determined location.

16. The method according to any one of embodiments 1 to 8, embodiment 14, or embodiment 15, wherein the method further comprises:
before the first device sends the tracking reference signal mapped to the time-frequency resource to the second device, sending, by the first device, fifth indication information to the second device, wherein the fifth indication information is used to indicate that the first device sends the tracking reference signal on the time-frequency resource.

17. The method according to any one of embodiments 1 to 8 or embodiments 14 to 16, wherein the method further comprises:
before the first device sends the tracking reference signal mapped to the time-frequency resource to the second device, sending, by the first device, sixth indication information to the second device, wherein the sixth indication information is used to indicate the quantity of tracking reference signals.

18. The method according to any one of embodiments 1 to 8 or embodiments 14 to 17, wherein the method further comprises:
before the first device sends the tracking reference signal mapped to the time-frequency resource to the second device, sending, by the first device, a seventh indication information to the second device, wherein the seventh indication information is used to indicate a location to which the tracking reference signal is mapped in the time-frequency resource.

19. The method according to any one of embodiments 1 to 8 or embodiments 14 to 18, wherein the method further comprises:
before the first device sends the tracking reference signal mapped to the time-frequency resource to the second device, sending, by the first device, eighth indication information to the second device, wherein the eighth indication information is used to indicate the tracking reference signal corresponding to the DMRS port.

20. A communications device, wherein the communications device comprises:
a processor, configured to generate a tracking reference signal, wherein the tracking reference signal corresponds to a DMRS port that is used by the communications device when the communications device sends data, and the tracking reference signal is used to track a phase change experienced by a tracking reference signal when the tracking reference signal is transmitted on a channel corresponding to the DMRS port; and further configured to map the tracking reference signal to a time-frequency resource that is used by the communications device when the communications device sends the data through the DMRS port, wherein the tracking reference signal is mapped to at least two modulation symbols on a same frequency resource in one transmission slot; and
a transceiver, configured to send the tracking reference signal mapped to the time-frequency resource.

21. The communications device according to embodiment 20, wherein there are at least two tracking reference signals; and correspondingly, at least two of the at least two tracking reference signals are mapped to different frequency resources in the time-frequency resource.

22. The communications device according to embodiment 20, wherein there are at least two tracking reference signals; and correspondingly, at least two of the at least two tracking reference signals are mapped to a same frequency resource in the time-frequency resource.

23. The communications device according to any one of embodiments 20 to 22, wherein when at least two DMRS ports are used by the communications device when the communications device sends the data, each of the at least two DMRS ports corresponds to one tracking reference signal.

24. The communications device according to embodiment 23, wherein at least two of the at least two DMRS ports correspond to a same tracking reference signal.

25. The communications device according to embodiment 24, wherein the at least two DMRS ports corresponding to the same tracking reference signal are quasi-co-located.

26. The communications device according to any one of embodiments 20 to 25, wherein an antenna port associated with the tracking reference signal and the DMRS port are quasi-co-located.

27. The communications device according to any one of embodiments 20 to 26, wherein a quantity of tracking reference signals is related to a quantity of time-frequency resources.

28. The communications device according to any one of embodiments 20 to 27, wherein the transceiver is further configured to receive first indication information, wherein the first indication information is used to instruct the communications device to send the tracking reference signal; and correspondingly, the processor is specifically configured to generate the tracking reference signal according to the first indication information.

29. The communications device according to any one of embodiments 20 to 28, wherein the transceiver is further configured to:

receive second indication information before the processor generates the tracking reference signal, wherein the second indication information is used to indicate a quantity of tracking reference signals that need to be generated.

30. The communications device according to embodiment 29, wherein the second indication information comprises resource scheduling information used to indicate the time-frequency resource, and the quantity of tracking reference signals that need to be generated is specifically determined based on the quantity of time-frequency resources indicated by the resource scheduling information.

31. The communications device according to any one of embodiments 20 to 30, wherein the transceiver is further configured to:

receive third indication information before the processor generates the tracking reference signal, wherein the third indication information is used to indicate a location to which the tracking reference signal is mapped in the time-frequency resource; and correspondingly, the processor is specifically configured to map the tracking reference signal to the location that is in the time-frequency resource and that is indicated by the third indication information.

32. The communications device according to any one of embodiments 20 to 31, wherein the transceiver is further configured to receive fourth indication information, wherein the fourth indication information is used to indicate the tracking reference signal corresponding to the DMRS port; and correspondingly, the processor is specifically configured to generate the tracking reference signal indicated by the fourth indication information.

33. The communications device according to any one of embodiments 20 to 27, wherein the processor is further configured to:

before the processor generates the tracking reference signal, determine, based on the quantity of time-frequency resources, a quantity of tracking reference signals that need to be generated; and correspondingly, that a processor is specifically configured to generate the determined quantity of tracking reference signals.

34. The communications device according to any one of embodiments 20 to 27 or embodiment 33, wherein the processor is specifically configured to:

when at least two tracking reference signals need to be generated, determine a location to which each tracking reference signal is mapped in the time-frequency resource; and map each tracking reference signal to the time-frequency resource based on the determined location.

35. The communications device according to any one of embodiments 20 to 27, embodiment 33, or embodiment 34, wherein the transceiver is further configured to send fifth indication information, wherein the fifth indication information is used to indicate that the communications device sends the tracking reference signal on the time-frequency resource.

36. The communications device according to any one of embodiments 20 to 27 or embodiments 33 to 35, wherein the transceiver is further configured to:

send sixth indication information before sending the tracking reference signal mapped to the time-frequency resource, wherein the sixth indication information is used to indicate the quantity of the tracking reference signals.

37. The communications device according to any one of embodiments 20 to 27 or embodiments 33 to 36, wherein the transceiver is further configured to:

send a seventh indication information before sending the tracking reference signal mapped to the time-frequency resource, wherein the seventh indication information is used to indicate a location to which the tracking reference signal is mapped in the time-frequency resource.

38. The communications device according to any one of embodiments 20 to 27 or embodiments 33 to 37, wherein the transceiver is further configured to:

send eighth indication information before sending the tracking reference signal mapped to the time-frequency resource, wherein the eighth indication information is used to indicate the tracking reference signal corresponding to the DMRS port.

A person of ordinary skill in the art may understand that all or some of the steps of the foregoing methods may be implemented by a program instructing related hardware. The program may be stored in a computer readable storage medium. The computer readable storage medium is, for example, a ROM, a RAM, or an optical disc.

To sum up, the foregoing descriptions are merely embodiments of the present invention, but are not intended to limit the protection scope of the present invention. Any modification, equivalent replacement, improvement, or the like made without departing from the spirit and principle of the present invention shall fall within the protection scope of the present invention.

The invention claimed is:

1. A reference signal sending method, wherein the reference signal sending method comprises:
mapping, by a first device, a tracking reference signal to a time-frequency resource, wherein the tracking reference signal is mapped to at least two modulation symbols on a same frequency resource in one transmission slot, wherein the same frequency resource comprises a subcarrier, and the subcarrier is determined based on an offset value that is calculated based on an identifier (ID) of the first device; and
sending, by the first device, the tracking reference signal mapped to the time-frequency resource to a second device.

2. The method according to claim 1, wherein the tracking reference signal corresponds to a demodulation reference signal (DMRS) port that is used by the first device when the first device sends data to the second device, and the tracking reference signal is used to track a phase change experienced by the tracking reference signal when the tracking reference signal is transmitted on a channel corresponding to the DMRS port.

3. The method according to claim 2, wherein when at least two DMRS ports are used by the first device when the first device sends the data to the second device, each of the at least two DMRS ports corresponds to one tracking reference signal.

4. The method according to claim 3, wherein at least two of the at least two DMRS ports correspond to a same tracking reference signal.

5. The method according to claim 4, wherein the at least two DMRS ports corresponding to the same tracking reference signal are quasi-co-located.

6. The method according to claim 2, wherein an antenna port associated with the tracking reference signal and the DMRS port are quasi-co-located.

7. The method according to claim 2, wherein the method further comprises:
before the first device generates the tracking reference signal, receiving, by the first device, third indication information sent by the second device, wherein the third indication information is used to indicate a location to which the tracking reference signal is mapped in the time-frequency resource; and
correspondingly, the mapping, by the first device, the tracking reference signal to a time-frequency resource that is used by the first device when the first device sends the data to the second device through the DMRS port specifically comprises:
mapping, by the first device, the tracking reference signal to the location that is in the time-frequency resource and that is indicated by the third indication information.

8. The method according to claim 2, wherein the mapping, by the first device, the tracking reference signal to a time-frequency resource that is used by the first device when the first device sends the data to the second device through the DMRS port specifically comprises:
when at least two tracking reference signals are generated, determining, by the first device, a location to which each tracking reference signal is mapped in the time-frequency resource; and
mapping each tracking reference signal to the time-frequency resource based on the determined location.

9. The method according to claim 2, wherein the method further comprises:
before the first device sends the tracking reference signal mapped to the time-frequency resource to the second device, sending, by the first device, a seventh indication information to the second device, wherein the seventh indication information is used to indicate a location to which the tracking reference signal is mapped in the time-frequency resource.

10. The method according to claim 2, wherein the method further comprises:
before the first device sends the tracking reference signal mapped to the time-frequency resource to the second device, sending, by the first device, eighth indication information to the second device, wherein the eighth indication information is used to indicate the tracking reference signal corresponding to the DMRS port.

11. A communications device, wherein the communications device comprises:
a processor, configured to map a tracking reference signal to a time-frequency resource, wherein the tracking reference signal is mapped to at least two modulation symbols on a same frequency resource in one transmission slot, wherein the same frequency resource comprises a subcarrier, the subcarrier is determined based on an offset value that is calculated based on an identifier (ID) of the first device; and
a transceiver, configured to send the tracking reference signal mapped to the time-frequency resource.

12. The communications device according to claim 11, wherein the tracking reference signal corresponds to a demodulation reference signal (DMRS port that is used by the communications device when the communications device sends data, and the tracking reference signal is used to track a phase change experienced by the tracking reference signal when the tracking reference signal is transmitted on a channel corresponding to the DMRS port.

13. The communications device according to claim 12, wherein when at least two DMRS ports are used by the communications device when the communications device sends the data, each of the at least two DMRS ports corresponds to one tracking reference signal.

14. The communications device according to claim 13, wherein at least two of the at least two DMRS ports correspond to a same tracking reference signal.

15. The communications device according to claim 14, wherein the at least two DMRS ports corresponding to the same tracking reference signal are quasi-co-located.

16. The communications device according to claim 12, wherein an antenna port associated with the tracking reference signal and the DMRS port are quasi-co-located.

17. The communications device according to claim 12, wherein the transceiver is further configured to:
receive third indication information before the processor generates the tracking reference signal, wherein the third indication information is used to indicate a location to which the tracking reference signal is mapped in the time-frequency resource; and
correspondingly, the processor is specifically configured to map the tracking reference signal to the location that is in the time-frequency resource and that is indicated by the third indication information.

18. The communications device according to claim 12, wherein the transceiver is further configured to receive fourth indication information, wherein the fourth indication information is used to indicate the tracking reference signal corresponding to the DMRS port; and correspondingly, the processor is specifically configured to generate the tracking reference signal indicated by the fourth indication information.

19. The communications device according to claim 12, wherein the transceiver is further configured to:

send a seventh indication information before sending the tracking reference signal mapped to the time-frequency resource, wherein the seventh indication information is used to indicate a location to which the tracking reference signal is mapped in the time-frequency resource.

20. A non-transitory computer readable storage medium, wherein the non-transitory computer readable storage medium stores a computer program, and when the computer program is run on a computer, the computer performs a method for sending a reference signal, the method comprising:

mapping a tracking reference signal to a time-frequency resource, wherein the tracking reference signal is mapped to at least two modulation symbols on a same frequency resource in one transmission slot, wherein the same frequency resource comprises a subcarrier, and the subcarrier is determined based on an offset value that is calculated based on an identifier (ID) of the first device; and sending the tracking reference signal mapped to the time-frequency resource to a second device.

* * * * *

UNITED STATES PATENT AND TRADEMARK OFFICE
CERTIFICATE OF CORRECTION

Page 1 of 1

PATENT NO. : 11,764,925 B2
APPLICATION NO. : 17/391785
DATED : September 19, 2023
INVENTOR(S) : Chen et al.

It is certified that error appears in the above-identified patent and that said Letters Patent is hereby corrected as shown below:

On the Title Page

Page 2: Item (56) Other Publications, Right-Hand Column, Line 30:
"http://www.3gpp.org/ftp/TSG RAN/WG1_RL1/TSGR1 87/Docs/" should read
-- http://www.3gpp.org/ftp/TSG_RAN/WG1_RL1/TSGR1_87/Docs/ --.

Page 2: Item (56) Other Publications, Right-Hand Column, Line 34:
"3gpp.org/ftp/TSG RAN/WG1 RL1/TSGR1 87/Docs/R1-1612492." should read
-- 3gpp.org/ftp/TSG_RAN/WG1_RL1/TSGR1_87/Docs/R1-1612492. --.

Page 2: Item (56) Other Publications, Right-Hand Column, Line 59:
"16,2017,3GPP,3GPPTSG-RAN WG1 £87ah-NR,Tdoc: R1-1700811," should read -- 16, 2017, 3GPP, 3GPP TSG-RAN WG1 #87ah-NR, Tdoc: R1-1700811, --.

In the Claims

Claim 12: Column 24, Line 39:
"demodulation reference signal (DMRS port that is used by" should read -- demodulation reference signal (DMRS) port that is used by --.

Signed and Sealed this
Second Day of January, 2024

Katherine Kelly Vidal
*Director of the United States Patent and Trademark Office*